United States Patent
Fischer et al.

(10) Patent No.: US 11,460,584 B2
(45) Date of Patent: Oct. 4, 2022

(54) METHODS FOR CORRECTING FOR ONE OR MORE ERRORS WHEN USING MOBILE NETWORK COMMUNICATION SIGNALS TO AUGMENT NAVIGATION AND DEVICES THEREOF

(71) Applicant: Orolia USA Inc., Rochester, NY (US)

(72) Inventors: John Fischer, Corfu, NY (US); Johnny Barnes Williams, Bowie, MD (US)

(73) Assignee: OROLIA USA INC., Rochester, NY (US)

(*) Notice: Subject to any disclaimer, the term of this patent is extended or adjusted under 35 U.S.C. 154(b) by 229 days.

(21) Appl. No.: 16/987,780

(22) Filed: Aug. 7, 2020

(65) Prior Publication Data
US 2021/0041571 A1 Feb. 11, 2021

Related U.S. Application Data

(60) Provisional application No. 62/884,916, filed on Aug. 9, 2019.

(51) Int. Cl.
*G01S 19/40* (2010.01)
*G01S 19/12* (2010.01)
(Continued)

(52) U.S. Cl.
CPC ............ *G01S 19/12* (2013.01); *G01S 19/393* (2019.08); *G01S 19/396* (2019.08); *G01S 19/40* (2013.01); *H04W 4/029* (2018.02)

(58) Field of Classification Search
CPC ........ G01S 19/40; G01S 19/12; G01S 19/393; G01S 19/396; H04W 4/029
(Continued)

(56) References Cited

U.S. PATENT DOCUMENTS 7,937,094 B2  5/2011  Feher
8,050,630 B1 * 11/2011  Arbuckle ................ G01S 19/23
                                                          455/67.11

(Continued)

FOREIGN PATENT DOCUMENTS

CN  109343096 A  *  2/2019  ............ G01S 19/48
WO  2016/108580 A1   7/2016
(Continued)

*Primary Examiner* — Harry K Liu
(74) *Attorney, Agent, or Firm* — Troutman Pepper Hamilton Sanders LLP

(57) ABSTRACT

A method, non-transitory computer readable medium, and device for correcting for one or more errors when using mobile network communication signals to augment navigation includes determining one or more pseudorange and range rate measurements for a computing device with respect to one or more cellular base stations. One or more of errors in the one or more pseudorange and range rate measurements are obtained which are determined based on previously received satellite positioning or time data. A current position or current time is determined based on the determined one or more pseudorange and range rate measurements and the one or more obtained errors when one of a plurality of states indicates current satellite positioning or timing data is unavailable. The determined current position or the determined current time for the computing device is provided.

18 Claims, 2 Drawing Sheets

(51) Int. Cl.
*H04W 4/029* (2018.01)
*G01S 19/39* (2010.01)

(58) Field of Classification Search
USPC .................................................. 342/357.23
See application file for complete search history.

(56) References Cited

U.S. PATENT DOCUMENTS

| | | | |
|---|---|---|---|
| 9,491,585 B2* | 11/2016 | Huang | .................. H04W 4/029 |
| 10,408,943 B2* | 9/2019 | Lennen | .................. G01S 19/393 |
| 2007/0040740 A1* | 2/2007 | Abraham | ........... H04B 1/70758 |
| | | | 375/E1.006 |
| 2012/0220293 A1 | 8/2012 | Feher | |
| 2014/0288824 A1* | 9/2014 | Huttunen | .............. G01S 5/0257 |
| | | | 701/472 |
| 2017/0070312 A1 | 3/2017 | Yi et al. | |

FOREIGN PATENT DOCUMENTS

| | | | |
|---|---|---|---|
| WO | 2017/164925 A1 | 9/2017 | |
| WO | 2017/213461 A1 | 12/2017 | |
| WO | WO-2019150343 A1 * | 8/2019 | ............ G06F 9/5011 |

* cited by examiner

METHODS FOR CORRECTING FOR ONE OR MORE ERRORS WHEN USING MOBILE NETWORK COMMUNICATION SIGNALS TO AUGMENT NAVIGATION AND DEVICES THEREOF

This application claims the benefit of U.S. Provisional Patent Application Ser. No. 62/884,916, filed Aug. 9, 2019, which is hereby incorporated by reference in its entirety.

FIELD

This technology generally relates to methods for correcting for one or more errors when using mobile network communication signals to augment navigation and devices thereof.

BACKGROUND

The Global Positioning System (GPS) is one of a number of global navigation satellite systems (GNSS) made up of a network of satellites. With GPS, a satellite navigation device can retrieve from one or more of these GNSS satellites location and time information in all weather conditions, anywhere on or near the Earth. In particular, a satellite navigation device can receive information from these GNSS satellites and then calculate a geographical position of the satellite navigation device. With this calculation, the satellite navigation device may display a position on a map and may offer routing directions.

GPS reception requires an unobstructed line of sight to four or more GPS satellites, and is subject to poor satellite signal conditions. In poor signal conditions, such as in urban areas by way of example, satellite signals may exhibit multipath propagation where signals bounce off structures or are weakened by meteorological conditions. Additionally, obstructed lines of sight may arise from a tree canopy or inside a structure, such as in a building, garage or tunnel.

To address these signal issues, satellite navigation device may use assisted GPS (A-GPS) technology, which can use the cellular network to obtain the GPS navigation messages to assist the GPS receiver to calculate its positioning and navigation solution faster at startup or when GPS signals are poor or unavailable. Position can also be determined from the cellular signal alone, using a combination of signal strength indication, ranging and antenna sectoring as is done in the E911 Location system. Accordingly, with this previously existing type of A-GPS there is no position determination being done using the cellular network. Instead, this previously existing type of A-GPS is only quickening the GPS process by getting the navigation data very fast and reliably over the cellular network (Mb/s) versus obtaining this navigation data much more slowly and less reliably from the GPS signal. In our method, we are doing position calculations from the cell network signal itself, and making it more accurate by correcting it from the knowledge we have from GPS, when available. After a while, we know all the corrections, so we can ignore GPS and use only the nice, strong, reliable cell signal for all our positioning. In other words: old method: cell net assists GPS. New method: GPS assist cell net to do a new function (positioning Further, this previously existing type of A-GPS as well as other previously existing technologies do not even contemplate the use of GPS to assist a cellular network to do positioning or other navigation because of the undesirable levels of errors introduced when using signals from base stations or cell towers in a cellular network to augment positioning or navigation. In particular, these errors may relate to one or more of the following issues: (1) Imprecision in the time of transmission; (2) Transmitter clock frequency error and drift over time; (3) Imprecise knowledge of the actual location of cellular base stations and transmitting antenna phase center; (4) Bandwidth limitation of the transmitted signal which limits measurement resolution and accuracy; (5) Doppler shift from movement of the computing device which is determining positioning; (6) Multipath yielding multiple or ambiguous measurements; and (7) Receiver clock frequency error and drift over time.

SUMMARY

An example of a method for correcting for one or more errors when using mobile network communication signals to augment navigation includes determining, by a computing device, one or more pseudorange and range rate measurements with respect to one or more cellular base stations. One or more of errors in the one or more pseudorange and range rate measurements are obtained, by the computing device, which are determined based on previously received satellite positioning or time data. A current position or current time is determined, by the computing device, based on the determined one or more pseudorange and range rate measurements and the one or more obtained errors when one of a plurality of states indicates current satellite positioning data is unavailable. The determined current position or the determined current time is provided, by the computing device.

Another example of a non-transitory machine-readable medium having stored thereon instructions comprising executable code which when executed by one or more processors, causes the processors to determine one or more pseudorange and range rate measurements for a computing device with respect to one or more cellular base stations. One or more of errors in the one or more pseudorange and range rate measurements are obtained which are determined based on previously received satellite positioning or time data. A current position or current time is determined based on the determined one or more pseudorange and range rate measurements and the one or more obtained errors when one of a plurality of states indicates current satellite positioning data is unavailable. The determined current position or the determined current time for the computing device is provided.

An additional example of a computing device having a memory comprising programmed instructions stored thereon and one or more processors configured to be capable of executing the stored programmed instructions to determine one or more pseudorange and range rate measurements for a computing device with respect to one or more cellular base stations. One or more of errors in the one or more pseudorange and range rate measurements are obtained which are determined based on previously received satellite positioning or time data. A current position or current time is determined based on the determined one or more pseudorange and range rate measurements and the one or more obtained errors when one of a plurality of states indicates current satellite positioning data is unavailable. The determined current position or the determined current time for the computing device is provided.

The claimed technology provides a number of advantages including providing methods, non-transitory computer readable media, and devices that correct for one or more errors when using mobile network communication signals to augment navigation. In particular, with examples of the claimed technology, extended filtering estimation techniques, such as an Extended Kalman Filtering (EKF) estimation technique or a Particle Filtering estimation technique by way of example only, combined with Machine Learning (ML) are used with pseudorange and range rate measurements from cellular base stations to aid in the navigation processing of a Global Navigation Satellite System/Inertial Navigation System (GNSS/INS) and other sensors. Through correlation across time of the pseudorange and range rate measurements with the position and velocity estimates made by the fully fused sensor processing in the navigation system, errors contributing to the pseudorange and range rate measurements are substantially isolated and reduced.

DETAILED DESCRIPTION

Figure 1:
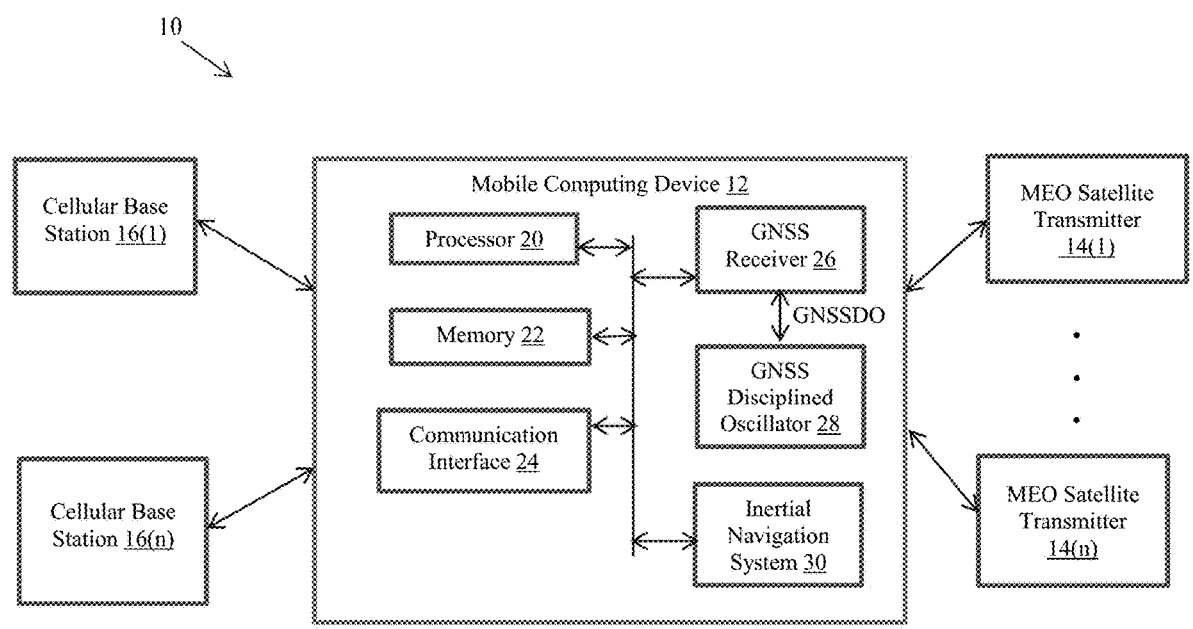
FIG. 1 is a block diagram of a communication environment with an example of a mobile navigation computing device that uses mobile network communication signals to augment navigation.

An environment 10 with an example of a mobile navigation computing device 12 that uses mobile network communication signals to augment navigation is illustrated in FIG. 1. In this example, the environment includes the mobile computing device, MEO satellite transmitters 14(1)-14(n), and cellular base stations 16(1)-16(n), although other types of non-GNSS navigation systems, such as LEO satellite transmitters by way of example, and other types and/or numbers of other systems, devices, components, and/or other elements in other configurations may be used. This technology provides a number of advantages including providing methods and devices that correct for one or more errors when using mobile network communication signals to augment navigation.

In one or more of the examples illustrated and described herein, the following acronyms are used:
CP—Cyclic Prefix, a 5G signal
CRS—Cell specific Reference Signal, a 5G signal
EKF—Extended Kalman Filter
GNSS—Global Navigation Satellite System, generic term for systems like GPS
IMU—Inertial Measurement Unit
INS—Inertial Navigation System
LEO—Low Earth Orbit
LTE—Long Term Evolution, the $4^{th}$ Generation of cellular networks (4G)
ML—Machine Learning
PSS—Primary Synchronization Signal, a 5G signal
PRS—Positioning Reference Signal, a 5G signal
SSS—Secondary Synchronization Signal, a 5G signal
STL—Satellite Time and Location signal, from Satelles Corp.
UTC—Universal Coordinated Time Referring more specifically to FIG. 2, the mobile navigation computing device 12 in this example includes at least one processor 20, a memory 22, a communication interface 24, a GNSS receiver 26, a GNSS disciplined oscillator 28, and an inertial navigation system 30 which are coupled together by a bus or other communication link, although the mobile navigation computing device 12 can include other types and/or numbers of elements in other configurations and this technology may be used with other types of computing devices.

The processor 20 of the mobile navigation computing device 12 may execute programmed instructions stored in the memory for the any number of the functions or other operations illustrated and described by way of the examples herein. The processor 20 of the mobile navigation computing device 12 may include one or more CPUs or other processors with one or more processing cores, for example, although other types of processor(s) can also be used.

The memory 22 of the mobile navigation computing device 12 stores these programmed instructions for one or more aspects of the present technology as illustrated and described herein, although some or all of the programmed instructions could be stored elsewhere. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor(s), can be used for the memory.

Figure 2:
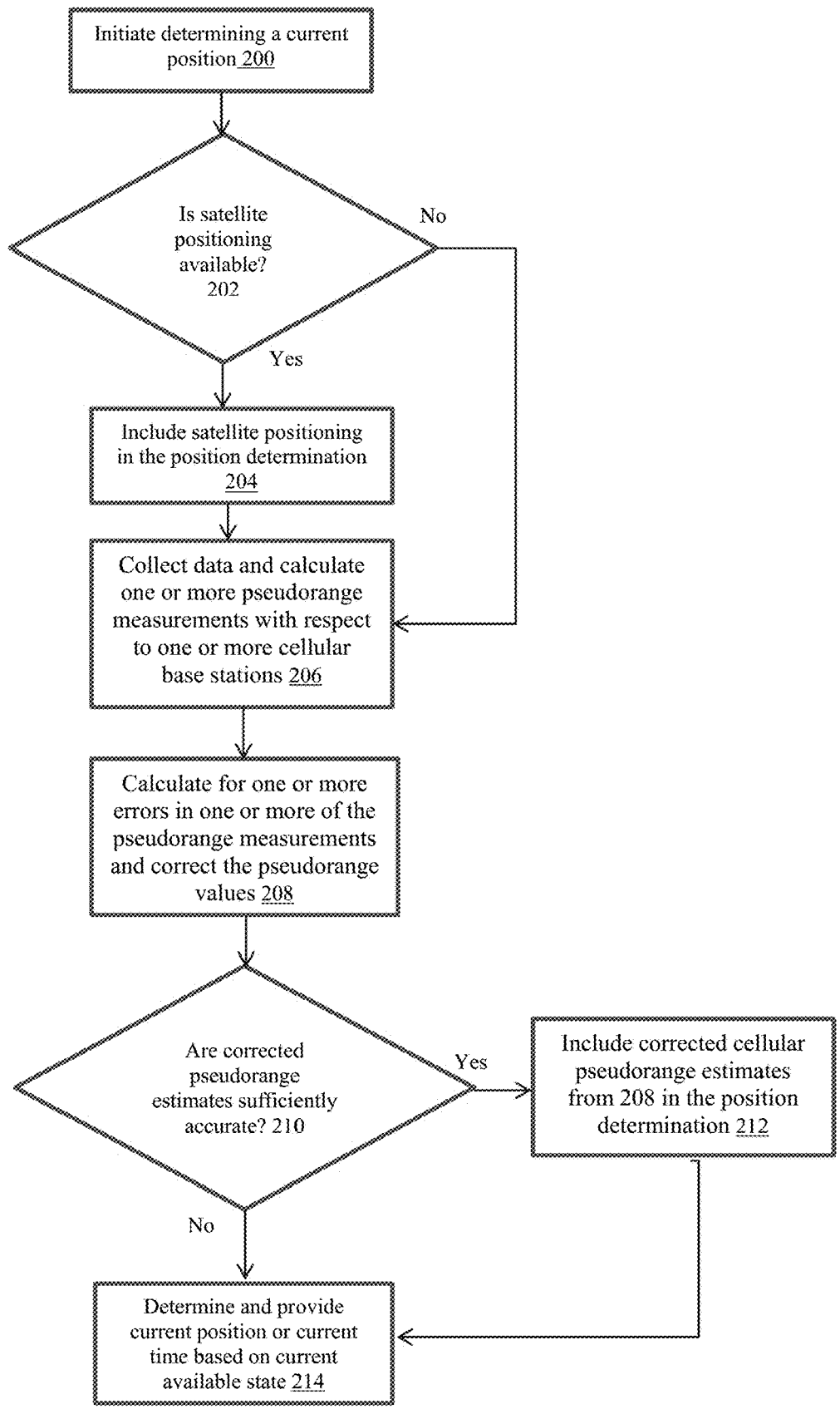
FIG. 2 is a flow chart of an example of a method for correcting for one or more errors when using mobile network communication signals to augment navigation.

Accordingly, the memory 22 of the mobile navigation computing device 12 can store application(s) that can include executable instructions that, when executed by the mobile computing device, cause the mobile navigation computing device 12 to perform actions, such as to transmit, receive, or otherwise process signals for providing navigation or other positioning, to correct for one or more errors, and to perform other actions illustrated and described by way of the examples herein with reference to FIG. 2. The application(s) can be implemented as modules or components of other application(s). Further, the application(s) can be implemented as operating system extensions, modules, plugins, or the like.

The communication interface 24 of the mobile navigation computing device 12 operatively couples and communicates between the mobile navigation computing device 12 and one or more MEO satellite transmitters 14(1)-14(n) and one or more cellular base stations 16(1)-16(n) which are all coupled together by one or more communication network(s), although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

The GNSS receiver 26 and the GNSS disciplined oscillator 28 of the mobile navigation computing device 12 are coupled together and are configured to operate as a GNSS receiver device, although the mobile navigation computing device 12 may have other types of receiver devices, such as a non-GNSS receiver device, or may be otherwise coupled or connected to one or more external receiver devices. The GNSS receiver 26 is configured to capture signals, such as data packets, from MEO satellite transmitters 14(1)-14(n) when time or navigation or other positioning is to be determined, although other types of receivers may be used. In this example, the GNSS disciplined oscillator 28 is an oscillator whose output is controlled to agree with the signals broadcast by MEO satellite transmitters 14(1)-14(n), although other types of controlled or disciplined oscillators or other timing elements with similar accuracy may be used. In this example, the GNSS disciplined oscillator 28 is an oscillator with at least about $10^{-6}$ stability to provide in these examples the necessary accuracy for the calculated measurements, although other stability ranges may be used. By way of example only, the GNSS disciplined oscillator 23 may be a TCXO—Temperature Compensated quartz crystal Oscillator with at least about $10^{-6}$ stability, an OCXO—Oven Controlled quartz crystal Oscillator with about a $10^{-8}$-$10^{-10}$ stability, or an Atomic Oscillator with about a $10^{-11}$-$10^{-12}$ stability.

In this example, one or more MEO satellite transmitters 14(1)-14(n) and one or more cellular base stations 16(1)-16(n) are illustrated, although other types of satellite transmitters, such as LEO satellite transmitters by way of example only, and other types of base stations may be used. The MEO satellites transmitters 14(1)-14(n) are configured to broadcast signals which can be received and processed by the mobile navigation computing device 12 for positioning and navigation. The one or more cellular base stations 16(1)-16(n) are configured to utilize mobile communication network signals, such as 5G or LTE by way of example, to facilitate mobile communications by the mobile communication device, although the mobile communication network signals may be used for other operations, such as to positioning and navigation.

Although the mobile navigation computing device 12, the MEO satellite transmitters 14(1)-14(n), and the cellular base stations 16(1)-16(n) are illustrated and described for purposes of the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the mobile computing device, cause the processor to carry out steps necessary to implement the methods of the examples of this technology that are illustrated and described herein.

An exemplary method for correcting for one or more errors when using mobile network communication signals to augment navigation will now be described with reference to FIG. 2. Referring more specifically to FIG. 2, in step 200 in this example the mobile navigation computing device 12 initiates determining a current position and/or current time.

In step 202, the mobile navigation computing device 12 determines whether positioning by GNSS is available. If in step 202 the mobile navigation computing device 12 determines that positioning by GNSS is available, then the Yes branch is taken to step 204.

In step 204, the mobile navigation computing device 12 determines a current position and/or current time based on signals from three or more of the MEO satellite transmitters 14(1)-14(n) which are captured and recorded by the GNSS receiver 26 and GNSS disciplined oscillator 28 and used by the processor 20 to execute programmed instructions from memory 22 to determine a current position and/or current time in a manner well known to those of ordinary skill in the art. By way of example, each of the three or more of the MEO satellite transmitters 14(1)-14(n) transmits coded signals which contain the satellite's precise orbit details and a very stable time stamp from an atomic clock. The time information broadcast as codes by the three or more of the MEO satellite transmitters 14(1)-14(n) so that the GNSS receiver 26 can continuously determine the time the signal was broadcast. The signal contains data that the GNSS receiver 26 and the processor 20 utilizes to compute the locations of the three or more of the MEO satellite transmitters 14(1)-14(n) and adjust for accurate positioning. The GNSS receiver 26 and the processor 20 use the time difference between the time of signal reception and the broadcast time to compute the distance, or range, from the GNSS receiver 26 to the three or more of the MEO satellite transmitters 14(1)-14(n). When the GNSS receiver 26 and processor 20 know the precise position of the mobile navigation computing device with respect to each of the three or more of the MEO satellite transmitters 14(1)-14(n), the GNSS receiver 26 and processor 20 obtain position information as well as time information. In this example, the mobile navigation computing device 12 is getting accurate position and velocity fixes from GNSS coverage, so the mobile navigation computing device 12 knows where it is within X (~1) meter. Depending on conditions and other navigational aids, such as Inertial Measurement Unit (IMU) or Real Time Kinematic (RTK) GNSS receivers by way of example, may also be used by the mobile navigation computing device 12.

If back in step 202, the mobile navigation computing device 12 determines that positioning by GNSS is not available, then the No branch is taken to step 206. In step 206, the mobile navigation computing device 12 collects data and calculates one or more pseudorange and range rate measurements with respect to one or more cellular base stations 16(1)-16(n) near the mobile navigation computing device 12, although other types and/or numbers of other measurements could be taken which can be used in the estimation process to correct for the errors discussed in the example herein. By way of example only, one or more of the following measurements can be obtained from received wireless communication signals, such as 5G or LTE at one or more of the cellular base stations 16(1)-16(n) near the mobile navigation computing device 12: (1) Signal angle of arrival at the antenna for one or more of the cellular base stations 16(1)-16(n); (2) Signal angle of departure from the antenna for one or more of the cellular base stations 16(1)-16(n); and/or (3) Uplink range and range rate as measured at one or more of the cellular base stations 16(1)-16(n). One or more of these measurements made at one or more of the cellular base stations 16(1)-16(n) may be communicated back to the mobile navigation computing device 12 over the network and used as part of the estimation process for determining positioning or time as illustrated and described by way of the examples herein. In this particular example, these pseudorange and range rate measurements are based on the received wireless communication signals, such as 5G or LTE, although other mobile communication structures may be used. In the new 5G signal structure, there are five different signals that are suitable for ranging—PSS, SSS, CP, PRS and CRS. All or any subset of these may be used. The mobile navigation computing device 12 may, for example, use these one or more pseudorange and range rate measurements to further enhance the GNSS or other satellite positioning determination, when satellite positioning is not available for determining positioning, or may send for storage for future use in positioning and other navigation.

As discussed above, the one or more pseudorange and range rate measurements obtained by the mobile navigation computing device 12 with respect to one or more of the cellular base stations 16(1)-16(n) are useful for positioning and other navigation, however the pseudorange and range rate measurements are susceptible to one or more errors.

By way of example, errors in one-way pseudorange and range rate measurements from one or more cellular base stations 16(1)-16(n) may occur due to one or more of the following: (1) Imprecision in the time of transmission—for example, cellular base stations 16(1)-16(n) should be synchronized to Universal Coordinated Time (UTC) via GNSS to within 1 μsec; (2) Transmitter clock frequency error and drift over time—for example, cellular base stations 16(1)-16(n) have frequency accuracy of $10^{-9}$; (3) Imprecise knowledge of the actual location of cellular base stations 16(1)-16(n) and transmitting antenna phase center; (4) Bandwidth limitation of the transmitted signal which limits measurement resolution and accuracy; (5) Doppler shift from movement of the mobile computing device; (6) Multipath yielding multiple or ambiguous measurements; and (7) Receiver clock frequency error and drift over time, although other types and/or numbers of errors may occur and other combinations may be utilized.

In step 208, the mobile navigation computing device 12 corrects for one or more of these errors in one or more of the pseudorange and range rate measurements, although the mobile navigation computing device 12 could correct for other errors in other obtained measurements, such as on or more measurements of: (1) Signal angle of arrival at the antenna for one or more of the cellular base stations 16(1)-16(n); (2) Signal angle of departure from the antenna for one or more of the cellular base stations 16(1)-16(n); and/or (3) Uplink range and range rate as measured at one or more of the cellular base stations 16(1)-16(n) by way of example only. Under normal GNSS tracking when determined to be available as discussed above, the mobile navigation computing device 12 assumes the determined position and velocity based on the satellite positioning signals is accurate. During this period, the mobile navigation computing device 12 estimates a pseudorange and range rate measurement error as the difference between a "true" range (within c of true) and the current measurements. This total error is in this example the sum of the errors listed above, although the total error can be a combination of other types and/or numbers of errors.

In this example to correct for the first error list above, the mobile navigation computing device 12 has a precise measurement of the UTC 1PPS time, usually within 10 s of nsecs when GNSS is available and, depending on the holdover oscillator, even during extended periods without GNSS. Therefore, the mobile navigation computing device 12 can estimate this first error by determining the difference between the mobile communication signals from each of the one or more cellular base stations 16(1)-16(n) and the Universal Coordinated Time (UTC) time via GNSS.

To correct for the second error listed above, the mobile navigation computing device 12 can model clock error and drift using an EKF. The mobile navigation computing device 12 has stored or may obtain data on the types of oscillators used in the cellular base stations 16(1)-16(n) and their detailed characteristics, so the mobile navigation computing device 12 can use statistical analysis and/or ML techniques to correlate which oscillators (type and serial number) are used in which base stations to determine a predicted error and drift over time.

To correct for the third error listed above, the mobile navigation computing device 12 has or can access a database of Latitude/Longitude positions for each of the cellular base stations 16(1)-16(n), but the accuracy of this information is not reliable. Moreover, to achieve meter-level accuracy, the mobile navigation computing device 12 needs the precise XYZ coordinates of the transmitting antenna phase center for each of the cellular base stations 16(1)-16(n). Accordingly, to correct for this error the mobile navigation computing device 12 can track installation/configuration changes at one or more of the cellular base stations 16(1)-16(n) and may use statistical analysis and/or ML techniques to make the correlations over time and position to identify any error.

The fourth error listed above is a function of the signal bandwidth: the error decreases as the bandwidth increases. Most LTE signals from cellular base stations 16(1)-16(n) are in the ~1 MHz range. In 5G systems these grow to 20 MHz or more so this error will be less in newer systems. In this example, this method does not directly correct this fourth error, but instead takes this fourth error into consideration when processing and correcting some subset or all the other types of errors illustrated and discussed by way of the examples herein, ensuring sufficient resolution of this fourth error as well to maximize the reduced error.

To correct for the fifth error listed above, the Doppler shift of the signal caused from movement of the mobile navigation computing device 12 is measured and compared to the expected Doppler shift as determined by the INS 30 and GNSS receiver 20. The INS/GNSS combination is measuring the velocity vector of the mobile navigation computing device 12 and this can be resolved into the velocity in the direction of the arriving signal. The comparison between the measured Doppler and the calculated Doppler from the velocity in the direction of the arriving signal forms the error.

The sixth error listed above is measured after some subset or all the other types of errors illustrated and discussed by way of the examples herein have been accounted for. Multipath error usually manifests itself in longer range measurements, and usually more discrete discontinuities in movement. Any range difference between the measured signal's pseudorange and the calculated range when the true position is known that fits these characteristics will be attributed to multipath. The locations where multipaths errors are noticed will be stored to create a map. In this example, through statistical analysis and machine learning processed by our available to the mobile computing device 12, correlation scores can be learned and stored for this map. When the mobile navigation computing device 12 returns to these locations with recorded high correlation scores for multipath errors, the stored error term can be used to correct the estimate.

The seventh error listed above is corrected by using the more accurate GNSS-disciplined clock instead of the cellular receiver clock. This can be done by either using the GNSS-disciplined clock directly or by adjusting the cellular receiver clock to the GNSS-disciplined clock.

Next, the error calculations are used to correct the pseudorange and range rate measurements to create more accurate values referred to in the examples herein as the pseudorange and range rate estimates.

If the corrected estimates determined in step 208 are now sufficiently accurate based on a comparison against an acceptable stored or otherwise obtained threshold, then the Yes branch in step 210 is taken and they are used in the position determination calculation along with the GNSS values (if valid) and the INS values. If the corrected estimates determined in step 208 are not sufficiently accurate based on a comparison against an acceptable stored or otherwise obtained threshold, then the No branch in step 210 and then only the GNSS values (if valid) and the INS values will be used.

In step 214, the mobile navigation computing device 12 may determine the current position and/or current time based on a current state. In this example, three states are used by the mobile navigation computing device, although other types and/or numbers of states may be used. In this illustrative example, the three states comprise:

State 1: GNSS Tracking and 5G/LTE data collection and estimation

State 2: GNSS Denial—positioning derived from 5G/LTE and INS integration

State 3: GNSS+5G/LTE+INS—sensor fusion navigation

While in State 1, the Extended Kalman Filtering (EKF) is constantly estimating the mobile navigation computing device 12 position, velocity and its accuracy X. Also, during this State, the EKF executing in the mobile navigation computing device 12 is receiving LTE/5G signals from all possible cellular base stations 16(1)-16(n) in the region. The mobile navigation computing device 12 is making range and Doppler measurements on the appropriate ranging signals from the one or more cellular base stations 16(1)-16(n) near the mobile navigation computing device 12 and then estimating the error parameters of each of the above error factors for each of the signals coming from each of the base stations. As the mobile navigation computing device 12 travels along, the mobile navigation computing device 12 may encounter many different cellular base stations 16(1)-16(n) and many different signals. Over time, mobile navigation computing device 12 will create a huge database of information about these cellular base stations 16(1)-16(n) and the signals emanating from them.

While in State 1, the processor 20 in the mobile navigation computing device 12 can determine the range and range rate (Doppler) error for each of the 5G/LTE signals the mobile navigation computing device 12 receives because the mobile navigation computing device 12 knows its own position and velocity to within X The difference between the measured value and the known true value will be the total error which will be the sum in this example of the seven error factors:

$$R^s = \text{Range determined from signal } s \text{ received from 5G/LTE}$$

$$RR^s = \text{Range Rate}$$

$$R^s_{Err} = R^s_{Measured} - R^s_{Calculated}$$

$$RR^s_{Err} = RR^s_{Measured} - RR^s_{Calculated}$$

$$R^s_{Calculated} = \text{Derived from the } EKF \text{ estimation process}$$

$$R^s_{Err} \text{ and } RR^s_{Err} = \text{will also equal the sum of the above 7 factors}$$

$$R^s_{Err} = BS_{TimeSyncErr} + BS_{AntPosErr} + R_{ResolutionErr} + R_{MultipathErr}$$

$$RR^s_{Err} = BS_{FreqErr} + User_{VelErr} + User_{ClkFreqErr}$$

Where:
BS=Base station
User=the moving equipment (the mobile navigation computing device 12) for which we are trying to determine accurate position, navigation and time Many of these error terms are time varying, so all of these equations are time varying, but not denoted here for simplifying the notation for ease of illustration.

There are many cellular base stations 16(1)-16(n) and potentially multiple signals from each cellular base station (1-n). In one example of the method, the simple case, there is only one mobile navigation computing device 12 for any given situation, but for example in more expanded implementations multiple mobile navigation computing devices similar in structure and operation with respect to the error correction to mobile navigation computing device 12 in this example can each be making these measurements and share the database. Each one of these individual error terms is a state variable for estimation by the EKF while it is operating in State 1.

When the mobile navigation computing device 12 is in State 1, $$R^s_{Calculated} \text{ and } RR^s_{Calculated}$$

are determined primarily from GNSS and INS inputs. When the mobile navigation computing device 12 transitions to State 2 (GNSS Denial), the error updates are frozen and $$R^s_{Err} \text{ and } RR^s_{Err}$$

are used to compensate the $$R^s_{Measured} \text{ and } R^s_{Measured}$$

values to create better estimates which are then used to update the INS. When the mobile navigation computing device 12 is in State 3, the error terms are both updated for refinement and used in the estimation process. Accordingly, once the current state is determined, the mobile navigation computing device 12 determines the current position and/or current time based on the available state and has substantially corrected for the errors as discussed in the examples herein.

Accordingly, as illustrated and described by way of the examples herein, this technology provides methods and systems that correct for one or more errors when using mobile network communication signals to augment navigation. In particular, with examples of the claimed technology as illustrated and described by way of the examples herein, extended filtering estimation techniques, such as an Extended Kalman Filtering (EKF) estimation technique or a Particle Filtering estimation technique by way of example only, combined with Machine Learning (ML) are used with pseudorange and range rate measurements from cellular base stations to aid in the navigation processing of a Global Navigation Satellite System/Inertial Navigation System (GNSS/INS) and other sensors. Through correlation across time of the pseudorange and range rate measurements with the position and velocity estimates made by the fully fused sensor processing in the navigation system, errors contributing to the pseudorange and range rate measurements are substantially isolated and reduced.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for correcting for one or more errors when using mobile network communication signals to augment navigation, the method comprising:
   determining, by a computing device, one or more pseudorange and range rate measurements with respect to one or more cellular base stations;
   correcting, by the computing device, one or more of errors in the one or more pseudorange and range rate measurements based on one or more other errors occurring as a result of the one or more cellular base stations;
   determining, by the computing device, a current position or current time based on the corrected one or more pseudorange and range rate measurements when one of a plurality of states indicates current satellite positioning or time data is unavailable; and
   providing, by the computing device, the determined current position or the determined current time.

2. The method as set forth in claim 1 wherein the one or more other errors comprise one or more of errors in: time of transmission; transmitter clock frequency error and drift over time; location of transmitting antenna phase center of one or more cellular base stations; bandwidth limitation of a signal from the one or more cellular base stations; Doppler shift from movement of the computing device; one or more multipath measurements from one or more cellular base stations; or clock frequency error and drift over time in the computing device.

3. The method as set forth in claim 1 wherein the correcting the one or more of errors from the one or more pseudorange and range rate measurements further comprises calculating at least one of the other errors by executing an Extended Kalman Filtering (EKF) estimation technique.

4. The method as set forth in claim 1 wherein the correcting the one or more of errors from the one or more pseudorange and range rate measurements further comprises calculating at least one of the other errors by executing a Particle Filtering estimation technique.

5. The method as set forth in claim 1 wherein the correcting the one or more of errors from the one or more pseudorange and range rate measurements further comprises calculating at least one of the other errors based on one or more executable rules generated based on machine learning trained on data used to determine one or more prior current positions or one or more prior current times.

6. The method as set forth in claim 1 further comprising:
   storing, by the computing device, the one or more errors in one or more centralized databases to use to determine a current position or a current time of one or more other computing devices without the current satellite positioning or time data.

7. A non-transitory machine-readable medium having stored thereon instructions comprising executable code which when executed by one or more processors, causes the processors to:
   determine one or more pseudorange and range rate measurements for a computing device with respect to one or more cellular base stations;
   correct one or more of errors in the one or more pseudorange and range rate measurements based on one or more other errors occurring as a result of the one or more cellular base stations;
   determine a current position or current time based on the corrected one or more pseudorange and range rate measurements when one of a plurality of states indicates current satellite positioning or time data is unavailable; and
   provide the determined current position or the determined current time for the computing device.

8. The medium as set forth in claim 7 wherein the one or more other errors comprise one or more of errors in: time of transmission; transmitter clock frequency error and drift over time; location of transmitting antenna phase center of one or more cellular base stations; bandwidth limitation of a signal from the one or more cellular base stations; Doppler shift from movement of the computing device; one or more multipath measurements from one or more cellular base stations; and; clock frequency error and drift over time in the computing device.

9. The medium as set forth in claim 7 wherein for the correct the one or more of errors from the one or more pseudorange and range rate measurements, the executable code, when executed by the processors further comprises executable code to:
   calculate at least one of the other errors by executing an Extended Kalman Filtering (EKF) estimation technique.

10. The medium as set forth in claim 7 wherein for the correct the one or more of errors from the one or more pseudorange and range rate measurements, the executable code, when executed by the processors further comprises executable code to:
    calculate at least one of the other errors by executing a Particle Filtering estimation technique.

11. The medium as set forth in claim 7 wherein for the correct the one or more of errors from the one or more pseudorange and range rate measurements, the executable code, when executed by the processors further comprises executable code to:
    calculate at least one of the other errors based on one or more executable rules generated based on machine learning trained on data used to determine one or more prior current positions or one or more current prior times.

12. The medium as set forth in claim 7 wherein the executable code, when executed by the processors, further causes the processors to:
    store the one or more errors in one or more centralized databases to use to determine a current position or a current time of one or more other computing devices without the current satellite positioning or time data.

13. A computing device comprising:
    a memory comprising programmed instructions stored thereon and one or more processors configured to be capable of executing the stored programmed instructions to:
    determine one or more pseudorange and range rate measurements for a computing device with respect to one or more cellular base stations;
    correct one or more of errors in the one or more pseudorange and range rate measurements based on one or more other errors occurring as a result of the one or more cellular base stations;
    determine a current position or current time based on the corrected one or more pseudorange and range rate measurements when one of a plurality of states indicates current satellite positioning or time data is unavailable; and provide the determined current position and/or time for the computing device.

14. The device as set forth in claim 13 wherein the one or more other errors comprise one or more of errors in: time of transmission; transmitter clock frequency error and drift over time; location of transmitting antenna phase center of one or more cellular base stations; bandwidth limitation of a signal from the one or more cellular base stations; Doppler shift from movement of the computing device; one or more multipath measurements from one or more cellular base stations; and; clock frequency error and drift over time in the computing device.

15. The device as set forth in claim 13 wherein for the correct the one or more of errors in the one or more pseudorange and range rate measurements, the processors are further configured to be capable of executing the stored programmed instructions to:

calculate at least one of the other errors by executing an Extended Kalman Filtering (EKF) estimation technique.

16. The device as set forth in claim 13 wherein for the correct n the one or more of errors in the one or more pseudorange and range rate measurements, the processors are further configured to be capable of executing the stored programmed instructions to:

calculate at least one of the other errors by executing a Particle Filtering estimation technique.

17. The device as set forth in claim 13 wherein for the correct the one or more of errors in the one or more pseudorange and range rate measurements, the processors are further configured to be capable of executing the stored programmed instructions to:

calculate at least one of the other errors based on one or more executable rules generated based on machine learning trained on data used to determine one or more prior current positions or one or more prior current times.

18. The device as set forth in claim 13 wherein the processors are further configured to be capable of executing the stored programmed instructions to:

store the one or more errors in one or more centralized databases to use to determine a current position or a current time of one or more other computing devices without the current satellite positioning or time data.

* * * * *